United States Patent
Ferreol

(10) Patent No.: US 8,290,093 B2
(45) Date of Patent: Oct. 16, 2012

(54) METHOD FOR BLIND DEMODULATION AT HIGHER ORDERS OF SEVERAL LINEAR WAVEFORM TRANSMITTERS

(75) Inventor: Anne Ferreol, Colombes (FR)

(73) Assignee: Thales, Neuilly sur Seine (FR)

( * ) Notice: Subject to any disclaimer, the term of this patent is extended or adjusted under 35 U.S.C. 154(b) by 690 days.

(21) Appl. No.: 11/917,761

(22) PCT Filed: Jun. 19, 2006

(86) PCT No.: PCT/EP2006/063304
§ 371 (c)(1),
(2), (4) Date: Aug. 12, 2008

(87) PCT Pub. No.: WO2006/134172
PCT Pub. Date: Dec. 21, 2006

(65) Prior Publication Data
US 2009/0220031 A1  Sep. 3, 2009

(30) Foreign Application Priority Data

Jun. 17, 2005 (FR) ..................... 05 06180

(51) Int. Cl.
*H04L 27/06* (2006.01)
(52) U.S. Cl. ........ 375/340; 375/316; 375/322; 375/341; 370/335; 370/345
(58) Field of Classification Search ............ 375/340, 375/316, 322, 341; 370/335, 342
See application file for complete search history.

(56) References Cited

U.S. PATENT DOCUMENTS

| | | | |
|---|---|---|---|
| 2002/0051433 A1* | 5/2002 | Affes et al. ................ | 370/335 |
| 2003/0048861 A1* | 3/2003 | Kung et al. ................ | 375/347 |
| 2003/0125040 A1* | 7/2003 | Walton et al. ............. | 455/454 |
| 2003/0204380 A1* | 10/2003 | Dishman et al. .......... | 702/189 |
| 2004/0156448 A1* | 8/2004 | Sahlin et al. .............. | 375/316 |
| 2004/0264403 A1* | 12/2004 | Fette et al. ................ | 370/328 |
| 2005/0105644 A1* | 5/2005 | Baxter et al. .............. | 375/316 |
| 2005/0128985 A1* | 6/2005 | Liberti et al. ............. | 370/335 |
| 2007/0140380 A1 | 6/2007 | Ferreol et al. | |

FOREIGN PATENT DOCUMENTS

FR  2862173 A  5/2005

OTHER PUBLICATIONS

Zarzoso et al., "Blind identification and equalization of mimo fir channels based on second-order statistics and blind source separation", Digital Signal Processing, 14th International Conference on Santorini, Greece, vol. 1, pp. 135-138 (Jul. 2002). XP010599703.

* cited by examiner

*Primary Examiner* — Kenneth Lam
(74) *Attorney, Agent, or Firm* — Lowe, Hauptman, Ham & Berner, LLP

(57) ABSTRACT

Disclosed is a method of blind demodulation of signals arising from one or more transmitters, the signals including a mixture of symbols comprising at least one step of separating the transmitters by using the temporal independence of the symbol trains specific to a transmitter and the mutual independence of the transmitters.

4 Claims, 4 Drawing Sheets

METHOD FOR BLIND DEMODULATION AT HIGHER ORDERS OF SEVERAL LINEAR WAVEFORM TRANSMITTERS

CROSS-REFERENCE TO RELATED APPLICATIONS

The present Application is based on International Application No. PCT/EP2006/063304, filed on Jun. 19, 2006, which in turn corresponds to French Application No. 05 06180 filed on Jun. 17, 2005, and priority is hereby claimed under 35 USC §119 based on these applications. Each of these applications are hereby incorporated by reference in their entirety into the present application.

FIELD OF THE INVENTION

The invention relates notably to a method of blind demodulation at higher orders of linear waveform where the signals of several radiocommunication transmitters are received on a system of several antennas.

BACKGROUND OF THE INVENTION

Antenna processing processes the observations originating from several sensors.

FIG. 1 shows a system of antennas composed of an array with several antennas receiving several radio-electric sources with different angles of incidence. The antennas of the array receive the sources with a phase and an amplitude dependent on the angle of incidence of the sources, as well as the position of the antennas. FIG. 2 shows that the angles of incidence of the sources can be parametrized either in one dimension, 1D, with the azimuth $\theta_m$ or in two dimensions, 2D, with the angles of azimuth $\theta_m$ and elevation $\Delta_m$.

Antenna processing techniques utilize the spatial diversity of the sources: use of the spatial position of the antennas of the array so as to better utilize the differences in incidence and in distance of the sources. Antenna processing breaks up into two major areas of activity:

Goniometry, the objective of which is to determine the incidences $\theta_m$ in 1D or the pair of incidences $(\theta_m, \Delta_m)$ in 2D. For this purpose, goniometry algorithms use the observations arising from the antennas or sensors. FIG. 2 shows that goniometry is performed in one dimension, 1D, when the waves from the transmitters propagate in the same plane and that otherwise it is necessary to apply goniometry in two dimensions, 2D. This plane of the waves is often that of the antenna array where the angle of elevation is zero.

Spatial filtering, illustrated in FIG. 3, the objective of which is to extract either the modulated signals $s_m(t)$, or the symbols contained in the signal (Demodulation). This filtering consists in combining the signals received on the sensor array so as to form an optimal reception antenna for one of the sources. Spatial filtering can be blind or cooperative. It is cooperative when there exists a priori knowledge about the signals transmitted (direction of arrival, symbol sequences, etc.) and it is blind in the converse case. Included in this activity are the activities of blind separation of sources, matched filtering on direction of arrival (beamforming) or on replicas, multisensor MODEM (demodulation), etc.

The current techniques of multiple input multiple output or MIMO blind demodulation [11] [12][13][14], have notably the drawback of processing only the case of baseband transmitters with 1 sample per symbol. In these techniques, there exist procedures utilizing solely statistics of order 2 [12]. Other procedures are extensions of the CMA technique [11] which, in particular, in single input multiple output or SIMO, have the drawback of converging less empty than order-2 procedures [5] [9]. The procedure in [13] has notably the drawback of demodulating the transmitters one after another by an iterative technique of successive elimination of the transmitters to be demodulated. This approach exhibits the drawback of not processing the transmitters in an equal manner.

The invention relates to a method of blind demodulation of signals arising from one or more transmitters, the signals consisting of a mixture of symbols where the signals are received on a system comprising several receivers characterized in that it comprises at least one step of separating the transmitters by using the temporal independence of the symbol trains $\{a_{k-p,i}\}$ indexed by "p" specific to a transmitter and the mutual independence of the transmitters, being the index of a transmitter by "i".

SUMMARY OF THE INVENTION

The method according to the invention exhibits notably the following advantages:

the symbol rates of the transmitters can be different and are, consequently, not necessarily equal to 1 sample per symbol, the transmitters are not necessarily baseband and can have different carrier frequencies, the transmitters are demodulated jointly without performing a technique of iterative demodulation of each of the transmitters. The technique does not make any assumption about the constellation as in document [11], the transmitters can have different shaping filters, the method is not affected by an over-estimation of order of the model as in [12] involving ARMA models (Auto Regressive with Adapted Mean)

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the present invention will be better apparent on reading the description which follows of an exemplary embodiment given by way of wholly nonlimiting illustration accompanied by the figures which represent.

DETAILED DESCRIPTION OF THE DRAWING

The method according to the invention relates notably to the demodulation, that is to say the extraction of the symbols $\{a_{km}\}$ transmitted by the $m^{th}$ transmitter.

Figure 1:
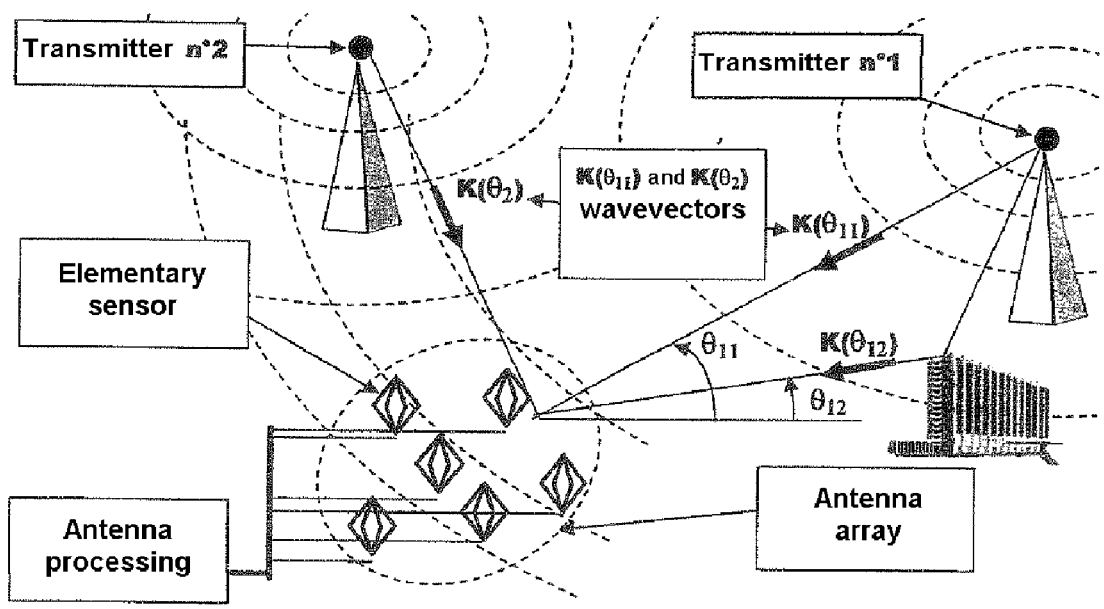
FIG. 1 a diagram comprising transmitters and an antenna processing system.
Figure 2:
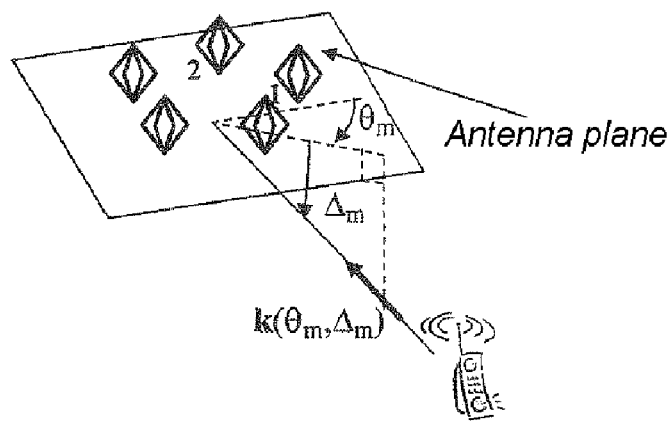
FIG. 2 the representation of an incidence of a source.
Figure 3:
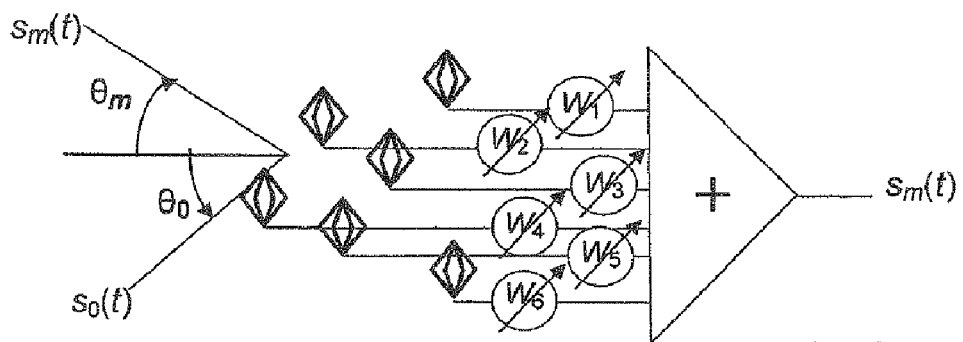
FIG. 3 spatial filtering by beamforming in a direction.
Figure 4:
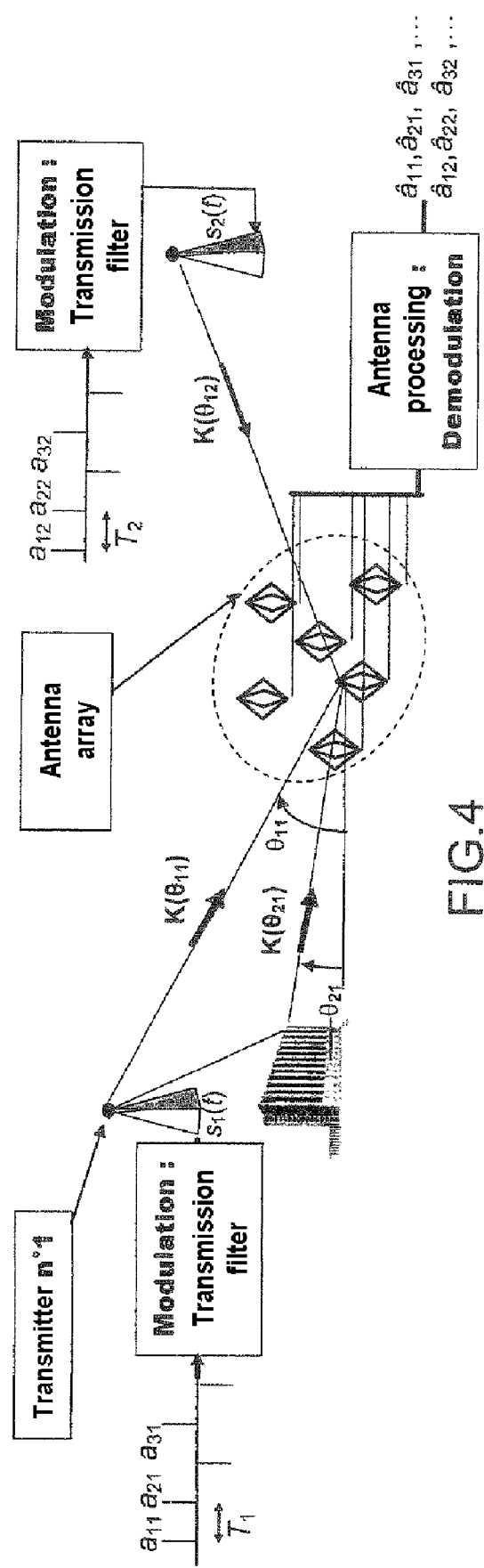
FIG. 4 a schematic of the demodulation of the symbols of the $m^{th}$ transmitter in the MIMO context, FIG. 5 a transmitter with linear modulation, FIG. 6 an exemplary constellation of a phase-shifted 8-QAM modulation, FIG. 7 a schematic of the steps of a first variant embodiment of the invention, and FIG. 8 a diagram of the steps of a second variant of the invention.

FIG. 4 illustrates the propagation of a signal through a multi-path channel. The $m^{th}$ transmitter transmits the symbol $a_{k,m}$ at the instant $kT_m$ where $T_m$ is the symbol period. Demodulation consists in estimating and detecting the symbols so as to obtain the symbols $\hat{a}_{km}$ at the output of the demodulator. FIG. 4 shows the case of two transmitters with linear modulation: the symbol train $\{a_{k,m}\}$ is filtered linearly by a transmission filter also called the shaping filter. The transmission filters of each of the transmitters may be different.

The method is concerned notably with techniques of blind demodulation of the symbols $\{a_{k,m}\}$ of several transmitters indexed by "m" with linear modulation. Blind techniques do not use any a priori information about the signals transmitted: shaping filter, training sequence, etc.

Before making explicit the steps implemented by the invention a few reminders necessary for the understanding thereof are given.

Linear Modulation

Figure 5:
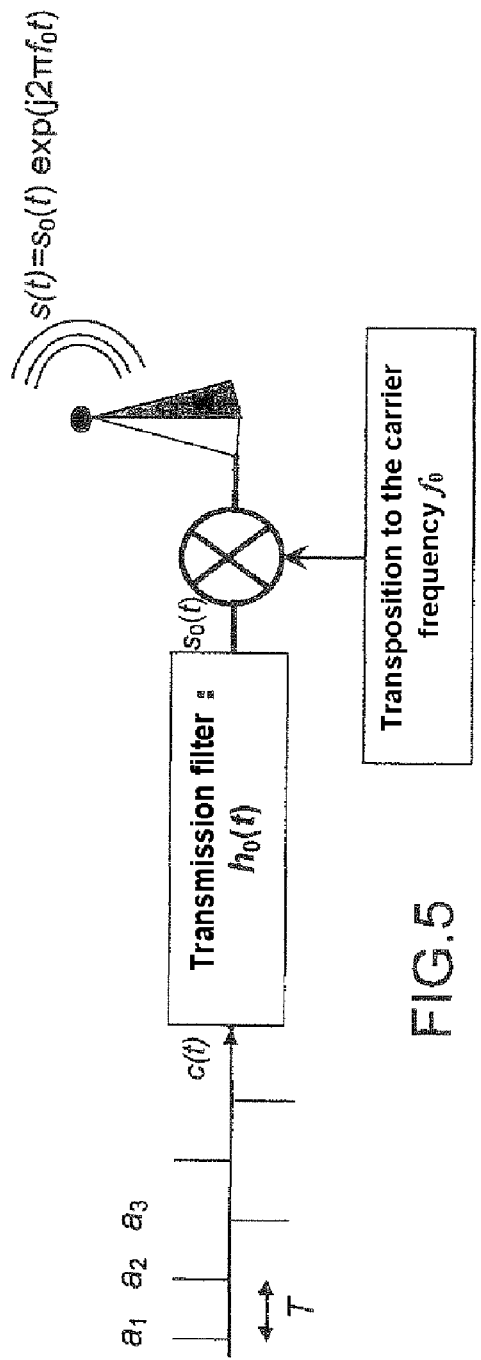

The diagram of FIG. 5 shows the process of the linear modulation of a symbol train $\{a_k\}$ with the rate T by a shaping filter $h_0(t)$.

The symbol comb $c(t)$ is first of all filtered by the shaping filter $h_0(t)$ and thereafter transposed to the carrier frequency $f_0$. The NRZ filter, which is a temporal gate of length T and defined by $h_0(t)=\Pi_T(t-T/2)$, is a particular example of a transmission filter. In radiocommunications, use is also made of the Nyquist filter whose Fourier transform $h_0(f) \approx \Pi_B(f-B/2)$ approximates to a gate of band B (the roll-off defines the slope of the filter outside of the band B, when the roll-off is zero then $h_0(f)=\Pi_B(f-B/2)$). The modulated signal $s_0(t)$ may be written at the instant $t_k=kT_e$ ($T_e$: sampling period) as a function of the symbol comb $c(t)$ in the following manner:

$$s_0(kT_e) = \sum_i h_0(iT_e)c((k-i)T_e). \quad (1)$$

We take for example a symbol time equal to an integer number of times the sampling period, in other words, we put $T=IT_e$ and—therefore, $k=mI+j$ with $0 \leq j<I$. Since $c(t)=\Sigma_r a_r \delta(t-rIT_e)$, stated otherwise, as $c(t)=a_u$ for $t=uIT_e$ and $c(t)=0$ for $t \neq iIT_e$, the only values of i for which $c((k-i)T_e)$ is nonzero satisfy $k-i=uI$, that is to say such that $i=mI+j-uI=nI+j$ where $n=m-u$. Ultimately, the expression (1) becomes:

$$s_0(mIT_e + jT_e) = \sum_{n=-L_0}^{L_0} h_0(nIT_e + jT_e)a_{m-n} \quad \text{for } 0 \leq j < I. \quad (2)$$

The parameter $L_0$ is the half-length of the transmission filter which is spread over a duration of $(2L_0+1)IT_e$. In the particular case of an NRZ transmission filter, we obtain $L_0=0$. As regards the signal $s(t)$, it satisfies $s(t)=s_0(t)\exp(j2\pi f_0 t)$, since it is equal to the signal $s_0(t)$ transposed to the frequency $f_0$. Under these conditions, the expression for $s(mIT_e+jT_e)$ is the following according to (2):

$$s(mIT_e + jT_e) = \sum_{n=-L_0}^{L_0} h_0(nIT_e + jT_e)\exp(j2\pi f_0(nI+j)T_e)a_{m-n} \quad (3)$$
$$\exp(j2\pi f_0(m-n)IT_e).$$
$$= \sum_{n=-L_0}^{L_0} h_{F0}(nIT_e + jT_e)b_{m-n}$$

such that $0 \leq j < I$.

where $h_{F0}(iT_e)=h(iT_e)\exp(j2\pi f_0 iT_e)$ and $b_i=a_i\exp(j2\pi f_0 iIT_e)$ Reception of the Signals on the Sensors: MIMO Case The Multiple Input Multiple Output, or MIMO for short, model is a system composed of N>1 antennas (MO) which receives a mixture of several linear modulation transmitters with signal $s_i(t)$ (MI) and symbol time $T_i$. More particularly, the signals $s_i(t)$ of each of the transmitters are linear modulations with $I_i$ samples per symbol, of waveform $h_i(t)$ and carrier frequency $f_i$ such that:

$$s_i(mI_iT_e + jT_e) = \sum_{n=-L_q}^{L_q} h_q(nI_iT_e + jT_e)\exp(j2\pi f_i(nI_i+j)T_e) \quad (4)$$
$$a_{m-n,q}\exp(j2\pi f_i(m-n)IT_e)$$
$$= \sum_{n=-L_q}^{L_q} h_{Fi}(nI_iT_e + jT_e)b_{m-n,i}$$

such that $0 \leq j < I$.

where $h_{Fi}(kT_e)=h_i(kT_e)\exp(j2\pi f_i kT_e)$ and $b_{k,i}=a_{k,i}\exp(j2\pi f_i kI_i T_e)$ where the $\{a_{k,i}\}$ are the symbols transmitted by the $i^{th}$ transmitter and $L_i$ is the half-length of the transmission filter of the $i^{th}$ transmitter.

FIG. 4 shows that the signal $s_i(t)$ of the $i^{th}$ transmitter passes through a propagation channel before being received on an array composed of N antennas. The propagation channel can be modeled by $P_i$ multi-paths of incidence $\theta_{pi}$, delay $\tau_{pi}$ and amplitude $\rho_{pi}$ ($1 \leq p \leq P_i$). At the output of the sensors, the M signals $s_i(t)$ are received on the sensors and the vector $x(t)$ is the sum of a linear mixture of the $P_i$ multi-paths of each of the M transmitters. This vector of dimension $N \times 1$ has the following expression:

$$x(t) = \sum_{i=1}^{M} x^i(t + t_i) + b(t) \text{ where} \quad (5)$$

$$x^i(t) = \sum_{p=1}^{P_i} \rho_{pi}a(\theta_{pi})s_i(t - \tau_{pi}) = A_i \Omega_i s_i(t).$$

where $\rho_{pi}$ is the amplitude of the $p^{th}$ path of the $i^{th}$ transmitter, $s_i(t)$ is the signal of the $i^{th}$ transmitter, $b(t)$ is the noise vector assumed Gaussian, $a(\theta)$ is the response of the sensor array to a source of incidence $\theta$, $A_i=[a(\theta_{1i}) \ldots a(\theta_{Pi})]$, $\Omega_i=\text{diag}([\rho_{1i} \ldots \rho_{Pi,i}])$ and $s_i(t)=[s_i(t-\tau_{1,i}) \ldots s_i(t-\tau_{Pi,i})]^T$. Noting that $\tau_{pi}=r_{pi}I_iT_e+\Delta\tau_{pi}$ where $(0 \leq \Delta\tau_{pi} < I_iT_e)$ and using expression (4) in equation (5), we obtain:

$$x^i(mI_iT_e + jT_e) = \sum_{p=1}^{P_i} \sum_{n=-L_i}^{L_i} \rho_{pi} a(\theta_{pi}) h_{Fi}(nI_iT_e + jT_e - \Delta\tau_{pi}) b_{m-n-r_p,i}. \quad (6)$$

By making the following change of variable $u_{pi} = n + r_{pi}$, we obtain:

$$x^i(mI_iT_e + jT_e) = \quad (7)$$

$$\sum_{p=1}^{P_i} \sum_{u_i=r_{pi}-L_i}^{r_{pi}+L_i} \rho_{pi} a(\theta_{pi}) h_{Fi}((u_{pi} - r_{pi})I_iT_e + jT_e - \Delta\tau_{pi}) b_{m-u_p,i}.$$

Now, putting $r_{min,i} = \min\{r_{pi}\}$ and $r_{max,i} = \max\{r_{pi}\}$, the previous equation can be written in the following manner:

$$x^i(mI_iT_e + jT_e) = \sum_{p=1}^{P_i} \sum_{u=r_{min,i}-L_i}^{r_{max,i}+L_i} \rho_{pi} a(\theta_{pi}) \quad (8)$$

$$h_{Fi}((u - r_{pi})I_iT_e + jT_e - \Delta\tau_{pi}) Ind_{[rpi-Li,rpi+Li]}(u) b_{m-u,i}.$$

Where $Ind_{[r,q]}(u)$ is the customary indicator function defined on the set of integers relating to value in the binary set $\{0,1\}$, characterized by $Ind_{[r,q]}(u)=1$ if u belongs to the interval [r,q] and $Ind_{[r,q]}(u)=0$ otherwise. Therefore, denoting by $v^i(t)$ the channel vector of the $i^{th}$ transmitter:

$$v^i(uI_iT_e + jT_e) = \quad (9)$$

$$\sum_{p=1}^{P_i} \rho_{pi} a(\theta_{pi}) h_{Fi}((u - r_{pi})I_iT_e + jT_e - \Delta\tau_{pi}) Ind_{[rpi-Li,rpi+Li]}(u).$$

where $t = uI_iT_e + jT_e$ and expression (6) becomes:

$$x^i(mI_iT_e + jT_e + t_i) = \sum_{u=r_{min,i}-L_i}^{r_{max,i}+L_i} v^i(uI_iT_e + jT_e + t_i) b_{m-u,i} \quad (10)$$

with $0 \leq j < I_i$.

Denoting by I the greatest common multiple of the integers $I_i$ ($1 \leq i \leq M$) and $J_i$ the integer satisfying $I = I_i J_i$, equation (5) becomes at $t = mIT_e + jT_e$:

$$x(mIT_e + jT_e) = \sum_{i=1}^{M} \sum_{u=r_{min,i}-L_i}^{r_{max,i}+L_i} v^i(uI_iT_e + \Delta j_i T_e + t_i) b_{mJ_i+\Delta m_i-u,i} + b(t) \quad (11)$$

with $0 \leq j < I$.

Where $j = \Delta m_i I_i + \Delta j_i$ with $0 \leq \Delta j_i < I_i$ and $0 \leq \Delta m_i \leq J_i$.

Inter Symbol Interference

The observation vector $x^i(t)$ arising from the antenna array at the instant $t = mI_iT_e + jT_e$ involves, according to equation (10), the symbol $b_{m,i}$ but also the symbols $b_{m-u,i}$ where u is a relative integer belonging to the interval $[r_{min,i}-L_i, r_{max,i}+L_i]$, a phenomenon which is better known by the name Inter Symbol Interference (ISI). We denote by $L_{c,i}$ this number of symbols participating in the ISI and we bound the interval of values taken by it. Thus, still according to equation (10), if the intersection of the intervals $[r_{pi}-L_i, r_{pi}+L_i]$ is not empty, then we have $L_{c,i} = |r_{max,i} - r_{min,i}| + 2L_i + 1$. Therefore, when $r_{max,i} = r_{min,i}$, that is to say when, more concretely, all the multi-paths are correlated, the lower bound of $L_{c,i}$ is attained and equals $L_{c,i} = 2L_i + 1$. This case is also conveyed mathematically by $$\left|\max_p\{\tau_{pi}\} - \min_p\{\tau_{pi}\}\right| < T_i.$$

On the other hand, if the intersection of said intervals is empty, and if, where relevant, all the intervals $[r_{pi}-L_i, r_{pi}+L_i]$ are disjoint, then we have $L_{c,i} = P_i \times (2L_i+1)$, thereby constituting an upper bound to the set of values capable of being taken by $L_{c,i}$. The latter typical case corresponds concretely to the case of multi-paths all of which are decorrelated pairwise, which mathematically can also be written $\forall k \neq l$, $|r_{ki} - r_{li}| > 2L_i$, a condition obtained as soon as $|\tau_{ki} - \tau_{li}| > (2L_i+1)T_i$. To summarize, the quantity $L_{c,i}$ generally satisfies the following bracketing:

$$2L_i + 1 \leq L_{c,i} \leq P_i \times (2L_i+1) \quad (12).$$

Expression (10) can then be rewritten in the following manner, where now only the $L_{c,i}$ symbols $b_{m-u,i}$ of interest appear:

$$x^i(mI_iT_e + jT_e) = \sum_{l=1}^{L_{c,i}} h^i(n(l)I_iT_e + jT_e) b_{m-n(l),i} \text{ with} \quad (13)$$

$$0 \leq j < I_i.$$

Where $\forall 1 \leq l \leq L_{c,i}$, and $r_{min,i} - L_i \leq n(l) \leq r_{min,i} + L_i$ and where:

$$h^i(t) = \sum_{p=1}^{P_i} \rho_{pi} a(\theta_{pi}) h_{Fi}(t - \tau_{pi}). \quad (14)$$

Equation (11) then becomes at $t = mIT_e + jT_e$:

$$x(mIT_e + jT_e) = \sum_{i=1}^{M} \sum_{l=1}^{L_{c,i}} h^i(n(l)I_iT_e + \Delta j_i T_e + t_i) b_{mJ_i+\Delta m_i-n(l),i} + b(t). \quad (15)$$

with $0 \leq j < I$

Where $j = \Delta m_i I_i + \Delta j_i$ with $0 \leq \Delta j_i < I_i$ and $0 \leq \Delta m_i < J_i$.

Variant Implementations of the Method According to the Invention

The rest of the description comprises, by way of wholly nonlimiting illustration, two variant embodiments of the method according to the invention. In the different cases, the separation techniques are applied to signals consisting of the mixture of symbols originating from one and the same transmitter and different propagation channels and of the mixture of the symbols arising from the various transmitters.

The first variant implementation of the method consists first of all in estimating the symbols $\{b_{k,i}\}$ (symbol on carrier of the $i^{th}$ transmitter), then in deducing the baseband symbols of the $i^{th}$ transmitter $\{a_{k,i}\}$ after estimating the frequency $f_i$ (frequency corresponding to transmitter i). For this purpose, the procedure executes a first step consisting notably in separating the signals of the various transmitters by an ICA technique and a second step consisting notably in extracting the symbols $\{b_{k,i}\}$ of each transmitter on the basis of the separated signals arising from the $1^{st}$ step. The $3^{rd}$ step consists in estimating the carrier frequency $f_i$ on the basis notably of the $\{b_{k,i}\}$ then in deducing the $\{a_{k,i}\}$. The extractions are done by ICA (Independent Component Analysis) type procedures described for example in references [3] [4] [8] [10].

The different variant embodiments of the method according to the invention involve, for example, ICA separation procedures based on the following signal model:

$$u_k = \sum_{i=1}^{L} g_i s_{ik} + n_k = G s_k + n_k. \quad (16)$$

where $u_k$ is a vector of dimension M×1 received at the instant k, $s_{ik}$ is the $i^{th}$ component of the signal $s_k$ at the instant k, $n_k$ is the noise vector and $G=[g_1 \ldots g_L]$. The objectives of ICA procedures are notably to extract the I=L components $s_{ik}$ and to identify their signatures $g_i$ on the basis of the observations $u_k$. The number I=L of components must be less than or equal to the dimension M of the observation vector. The procedures described in references [3] [4] [8] use the statistics of order 2 and 4 of the observations $u_k$.

The first step uses the order-2 statistics of the observations to obtain a new observation $z_k$ such that:

$$z_k = W_1 u_k = \sum_{i=1}^{L} \check{g}_i s_{ik} + \tilde{n}_k = \check{G} s_k + \tilde{n}_k. \quad (17)$$

where the signatures $\check{g}_i$ ($1 \leq i \leq L$) are orthogonal, $\check{G}=[\check{g}_1 \ldots \check{g}_L]$ and $s_k=[s_{1k} \ldots s_{Lk}]^T$.

The second step consists in identifying the orthogonal basis of the $\check{G}$ from the order-4 statistics of the whitened observations $z_k$. Under these conditions, it is possible to extract the signals $s_k$ by performing:

$$\hat{s}_k = \check{G}^{\#} W_1 u_k \quad (18).$$

Where $\hat{s}_k$ is the estimate of the signals $s_k$ and where $^{\#}$ is the pseudo-inversion operator defined by $\check{G}^{\#}=(\check{G}^H \check{G})^{-1} \check{G}^H$.

The ICAR procedure [10] uses for its part solely the statistics of order 4 to identify the matrix $G=[g_1 \ldots g_K]$ of the signatures.

Figures 7, 8:
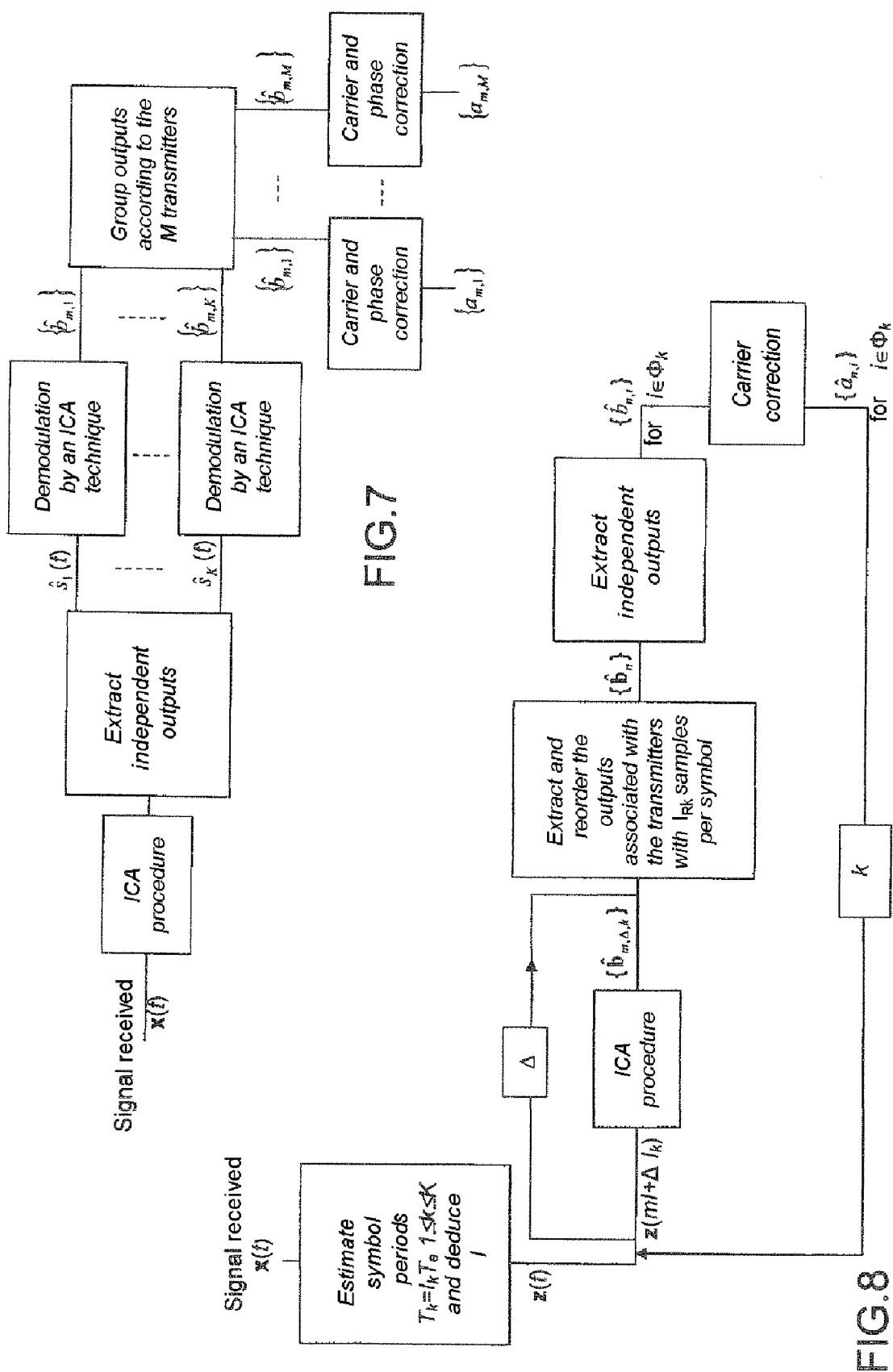

First Variant Embodiment: MIMO Demodulation with an ICA Step for Separating the Transmitters FIG. 7 shows diagrammatically a $1^{st}$ variant of the method comprising a first step of separating the transmitters by an ICA technique and a second step consisting notably in extracting the symbols of each transmitter by an ICA technique.

Each transmitter is composed of $Q_i$ groups of correlated multi-paths. The multi-paths of the $i^{th}$ transmitter whose delays satisfy $|\tau_{ki}-\tau_{li}|<(2L_i+1)T_i$, are mutually correlated by satisfying: $E[s(t-\tau_{ki})s(t-\tau_{ij})^*] \neq 0$. The model of equation (5) becomes:

$$x^i(t) = \sum_{q=1}^{Q_i} \sum_{p=1}^{P_{iq}} \rho_{piq} a(\theta_{piq}) s_i(t-\tau_{piq}) = \sum_{q=1}^{Q_i} A_{iq} \Omega_{iq} s_i(t, \underline{\tau}_{iq}). \quad (19)$$

Where $A_{iq}=[a(\theta_{1iq}) \ldots a(\theta_{P_{iq},i,q})]$, $\Omega_{iq}=\text{diag}([\rho_{Pq,i,q}])$ and $s_i(t, \underline{\tau}_{iq})=[s_i(t-\tau_{1iq}) \ldots s_i(t-\tau_{Pq,i,q})]^T$ with $\underline{\tau}_{iq}=[\tau_{1iq} \ldots \tau_{Pq,i,q}]^T$. Consequently, the signal x(t) may be written:

$$x(t) = \sum_{i=1}^{M} \sum_{q=1}^{Q_i} A_{iq} \Omega_{iq} s_i(t, \underline{\tau}_{iq}) + b(t). \quad (20)$$

By applying an ICA procedure to the signal x(t), the following signals and signatures are estimated at the output of the separator according to [6]:

$$\hat{A}=[\hat{a}_1 \ldots \hat{a}_k]=[A_{11}U_{11} \ldots A_{iq}U_{iq} \ldots A_{M,Q_M}U_{M,Q_M}]\Pi$$

$$\text{and } \hat{s}(t) = \begin{bmatrix} \hat{s}_1(t) \\ \vdots \\ \hat{s}_K(t) \end{bmatrix} = \Pi \begin{bmatrix} V_{11} s_1(t, \underline{\tau}_{11}) \\ \vdots \\ V_{iq} s_i(t, \underline{\tau}_{iq}) \\ \vdots \\ V_{M,Q_M} s_M(t, \underline{\tau}_{M,Q_M}) \end{bmatrix}. \quad (21)$$

Where $$K = \sum_{i=1}^{M} \sum_{q=1}^{Q_i} P_{iq}, U_{iq} V_{iq} = \Omega_{iq}$$

and $V_{iq} E[s(t, \underline{\tau}_{iq}) s(t, \underline{\tau}_{iq})^H] V_{iq}^H = I_{Piq}$. The matrix $\Pi$ is a permutation matrix.

Separation of the $$\sum_{i=1}^{M} Q_i$$

Groups of Correlated Multi-Paths

The decorrelated paths such that $E[s_i(t-\tau_{piq})s_i(t-\tau_{pi,q'})^*]=0$ are received on different pathways $\hat{s}_k(t)$ and $\hat{s}_l(t)$. The correlated paths where $E[s_i(t-\tau_{piq})s_i(t-\tau_{p'iq})^*] \neq 0$ are present on $P_{Qi}$ pathways $\hat{s}_k(t)$. The different transmitters i and j satisfy $E[s_i(t)s_j(t)^*]=0$ and their multi-paths are present on different pathways $\hat{s}_k(t)$. In the $1^{st}$ step of this variant, the method separates the multi-paths that are decorrelated on different pathways and makes it possible to identify the $$\sum_{i=1}^{M} Q_i$$

groups of correlated multi-paths of all the transmitters indexed by "i". By taking the outputs k and l of the separator, the following two assumptions can be tested:

$$H_0: \begin{cases} \hat{s}_k(t) = b_k(t) \\ \hat{s}_l(t) = b_l(t) \end{cases} \text{ and } H_1: \begin{cases} \hat{s}_k(t) = \alpha_k s_i(t-\tau_{ip}) + b_k(t) \\ \hat{s}_l(t) = \alpha_l s_i(t-\tau_{ip}) + b_l(t). \end{cases} \quad (22)$$

where $E[b_k(t)b_l(t-\tau)^*]=0$ whatever the value of $\tau$. Thus, under the assumption $H_0$ there are no multi-paths common to the two outputs k and l and under the assumption $H_1$ there is at least one for the $i^{th}$ transmitter.

The test consists in determining whether the outputs $\hat{s}_k(t)$ and $\hat{s}_l(t-\tau)$ are correlated for at least one of the values of $\tau$ satisfying $|\tau|<\tau_{max}$. For this purpose, Gardner's test [2]—, which compares the following likelihood ratio with a threshold, is for example applied:

$$V_{kl}(\tau) = -2K\ln\left(1 - \frac{|\hat{r}_{kl}(\tau)|^2}{\hat{r}_{kk}(0)\hat{r}_{ll}(0)}\right) \text{ with} \quad (23)$$

$$\hat{r}_{kl} = \frac{1}{K}\sum_{k=1}^{K} \hat{s}_k(t)\hat{s}_l(t-\tau)^*.$$

Where $V_{kl}(\tau)<\eta \Rightarrow$ assumption $H_0$
And $V_{kl}(\tau) \geq \eta \Rightarrow$ assumption $H_1$ The threshold $\eta$ is determined in [2] with respect to a chi-2 law with 2 degrees of freedom. One first of all seeks the outputs associated with the $1^{st}$ output by conducting the test for $2<l\leq K$ and $k=1$. Then from the list of the outputs are removed all the outputs associated with the $1^{st}$ which will constitute the $1^{st}$ group with q=1. The same series of tests is repeated with the other outputs not correlated with the $1^{st}$ output so as to constitute the $2^{nd}$ group. This operation is performed until the last group where, finally, there are no more output pathways. As output from the sort operation the following is ultimately obtained:

$$\hat{A}_n = A_{iq}U_{iq} \text{ and } \hat{s}_n(t) = V_{iq}s_i(t,\underline{\tau}_{iq}) \text{ for } (1\leq q\leq Q_i) \text{ and } (1\leq i\leq M) \quad (24)$$

We therefore obtain $$K_M = \sum_{i=1}^{M} Q_i$$

matrix-vector pairs $(\hat{A}_n,\hat{s}_n(t))$ associated with the $q^{th}$ group of correlated multi-paths of the $i^{th}$ transmitter.

The association between the index "n" and the pair of indices (i,q) is done on completion of the demodulation on each of the vectors $\hat{s}_n(t)$. The vector $\hat{s}_n(t)$ is a linear combination of $P_i$ correlated multi-paths of the $i^{th}$ transmitter.

Incidence and Delay Estimation of Each Group of Multi-Paths.

According to an optional step, the incidences $\theta_{p,i,q}$ (corresponding to the $p^{th}$ multi-path, of the $q^{th}$ group of correlated multi-paths of the $i^{th}$ transmitter) are determined on the basis of the $\hat{A}_n$ of equation (24) by applying for example the MUSIC algorithm [1] to the matrix $\hat{A}_n\hat{A}_n^H$. The matrices $A_n = A_{iq} = [a(\theta_{1,i,q}) \ldots a(\theta_{Pi,i,q})]$ are deduced from the goniometries thus obtained. Given that $x_n(t)=\hat{A}_n\hat{s}_n(t)=A_{iq}\Omega_{iq}s_i(t,\underline{\tau}_{iq})$, we deduce $s_i(t,\underline{\tau}_{iq})$ to within a diagonal matrix by performing $\hat{s}_i(t,\underline{\tau}_{iq})=A_{iq}^{\#}x_n(t)$. As the elements of the $\hat{s}_i(t,\underline{\tau}_{iq})$ are composed of the signals $s_i(t-\tau_{p,i,q})$, the delays $\tau_{p,i,q-\tau 1,i,l}$ are determined by maximizing the criteria $c(\tau)=|\hat{s}_i^{pq}(t-\tau)-\hat{s}_i^{11}(t-\tau)|^2$ where $\hat{s}_i(t)$ is the $p^{th}$ component of $\hat{s}_i(t,\tau_{iq})$.

Demodulation of the Vectors $\hat{s}_n(t)$ Arising from the $1^{st}$ ICA Step

The output vector $\hat{s}_n(t)$ arising from the $1^{st}$ step of separating the groups of correlated multi-paths is associated with the $i^{th}$ transmitter and $q^{th}$ multi-path group by satisfying: $\hat{s}_n(t)=V_{iq}s_i(t,\underline{\tau}_{iq})$. The output $\hat{s}_n(t)$ is associated with a single transmitter with $I_i$ samples per symbol that can be determined by a cyclic detection technique on $\hat{s}_n(t)$. As, according to equation (4), the vector $s_i(t,\underline{\tau}_{iq})$ satisfies:

$$s_i(mI_iT_e + jT_e, \underline{\tau}_{iq}) = \begin{bmatrix} s_i(mI_iT_e + jT_e - \tau_{q,i,1}) \\ \vdots \\ s_i(mI_iT_e + jT_e - \tau_{q,i,P_{qmax}}) \end{bmatrix} \quad (25)$$

$$= \sum_{k=-L_i}^{L_i} h_{Fi}(kI_iT_e + jT_e, \underline{\tau}_{iq})b_{m-k,i}$$

for $0 \leq j < I_i$ and with $$h_{Fi}(kI_iT_e + jT_e, \underline{\tau}_{iq}) = \begin{bmatrix} h_{Fi}(kI_iT_e + jT_e - \tau_{q,i,1}) \\ \vdots \\ h_{Fi}(kI_iT_e + jT_e - \tau_{q,i,P_{iq}}) \end{bmatrix}$$

it is possible to construct the following observation vector according to (24):

$$z_n(mI_iT_e) = \begin{bmatrix} \hat{s}_n(mI_iT_e) \\ \hat{s}_n(mI_iT_e + T_e) \\ \vdots \\ \hat{s}_n(mI_iT_e + (I-1)T_e) \end{bmatrix} = \sum_{k=-L_i}^{L_i} h_{zi}(k)b_{m-k,i} \quad (26)$$

$$\text{where } h_{zi}(k) = \begin{bmatrix} h_{k,0}^i \\ h_{k,1}^i \\ \vdots \\ h_{k,l_i-1}^i \end{bmatrix}.$$

where $h_{k,j} = V_{iq}h_{Fi}(kI_iT_e+jT_e, \underline{\tau}_{iq})$

This first variant embodiment can apply a procedure of ICA type [3] [4] [8] [10] to the observation vector $z_n(t)$ to estimate the $2L_i+1$ symbol trains $\{b_{m-k,i}\}$ indexed by "k". The $k^{th}$ output of the ICA procedure gives the symbol train $\{\hat{b}_{m,k,n}\}$ associated with the channel vector $\hat{h}_{zn,k}$, where $\hat{b}_{m,k,n}$ is the estimate of the symbol $b_{m-l,i}$. However, the estimated symbol trains $\{\hat{b}_{m,k,n}\}$ arrive in a different order from that of the trains $\{b_{m-1,i}\}$ while satisfying:

$$\hat{b}_{m,k,n} = \rho_k\exp(j\alpha_k)b_{m-l,i} \text{ and } \hat{h}_{z,n,k} = h_{zi}(l) \quad (27)$$

On completion of this step, the output $\hat{b}_{m,k_{max},n}$ associated with the channel vector $\hat{h}_{z,n,k_{max}}$ of largest modulus is determined. As the symbol trains $\{\hat{b}_{m-l,i}\}$ are all of the same power, we write:

$$\hat{b}_{m,n} = \frac{\hat{b}_{m,k_{max},n}}{\sqrt{E\left[|\hat{b}_{m,k_{max},n}|^2\right]}} \text{ and } \hat{h}_{z,n} = \hat{h}_{z,n,k_{max}}. \quad (28)$$

Where:

$$\hat{b}_{m,n} = \exp(j\alpha_n)b_{m-l,i} \text{ and } \hat{h}_{z,n} = h_{zi}(l) \quad (29)$$

On completion of this step, there remain Qi symbol trains $\{\hat{b}_{m,n}\}$ associated with the same transmitter "i".

Association of the Symbol Trains Dependent on the Same Transmitter

In this step, a factor $L_{max}$ of maximum coherence of the symbols is chosen. It is therefore assumed that the temporal spreading of the transmitters does not exceed $L_{max}T_e$. The step consists notably in associating the Qi outputs $(\hat{b}_{m,n}, \hat{h}_{z,n})$ of each transmitter so as to extract therefrom a single one per transmitter. For this purpose, the sub-method performs a pairwise intercorrelation, of the outputs $\hat{b}_{m,k}$ and $\hat{b}_{m,l}$ by calculating the following criterion $c_{k,l}(t)$:

$$c_{k,l}(t) = \frac{E[\hat{b}_{m,k}\hat{b}^*_{m-t,l}]}{\sqrt{E[|\hat{b}_{m,k}|^2]E[|\hat{b}_{m-t,l}|^2]}}. \quad (30)$$

When the function $|c_{i,j}(t)| > \eta$ for $|t| < L_{max}$ is satisfied, the symbol trains $\{\hat{b}_{m,k}\}$ and $\{\hat{b}_{m,l}\}$ are associated with the same transmitter, where $\eta$ is a threshold similar to the threshold usually used in Gardner's test [2].

Typically we take $\eta = 0.9$ since $0 < |c_{i,j}(t)| < 1$. When $|c_{i,j}(t)| > \eta$, the maximum of $|c_{i,j}(t)|$ is at $t = t_{max}$ for the $k^{th}$ and $l^{th}$ trains satisfying: $\hat{b}_{m,k} = \hat{b}_{m-t_{max},l}$. The algorithm for associating the outputs $\hat{b}_{m,n}$ ($1 \leq n \leq K$) per transmitter is then composed of the following steps:

Step no A.1: Initialization: i=1, flag$_i$=0 and $\Phi_i = \{(\hat{b}_{m,i}, \hat{h}_{z,i})\}$ tab$_i = \{i\}$ for ($1 \leq i \leq K$) flag$_i$, indicating whether the pair $(\hat{b}_{m,i}, \hat{h}_{z,i})$ considered is already associated with a transmitter in one of the sets $\Phi_i$, tab$_i$ corresponds to the index of the outputs of the set $\Phi_i$, $\Phi_i$ is the set of the outputs associated with one and the same transmitter, Step no A.2: Initialization to j=i+1.

Step no A.3: Search for the maximum $|c_{i,j}(t_{max})|$ at $t = t_{max}$ for $|t| < L_{max}$.

Step no A.4: If $|c_{i,j}(t_{max})| > \eta$ and flag$_j$=0 then flag$_j$=1, $\Phi_i = \{\Phi_i, (\hat{b}_{m,j}, \hat{h}_{z,j})\}$ and tab$_i$={ab$_i$j}

Step no A.5: j=j+1

Step no A.6: If j<K then return to Step no A.3.

Step no A.7: i=i+1

Step no A.8: If i<K then return to Step no A.2.

Step no A.9: Determination of the M sets $\Phi_i$ where flag$_{j_i}$=0: the sets $\Phi'_i$ ($1 \leq i \leq K$) are obtained where $\Phi'_i = \{(\hat{b}_{m,j}, \hat{h}_{z,j})\}$ such that j∈tab$_i$}, which sets correspond to the pairs which are not associated with other sets.

Step no A.10: Initialization: i=1. For each group we seek the most powerful output used to obtain the best symbol train at the output of the blind demodulator.

Step no A.11: Search for the vector $\hat{h}_{z,j_{max}}$ of maximum modulus in $\Phi'_i$. We will then write $\hat{b}_{m,i} = \hat{b}_{m,j_{max}} = \exp(j\alpha_i)b_{m,i}$ and $\hat{h}_{z,i} = \hat{h}_{z,j_{max}}$. i=i+1.

Step no A.12: If i<M then return to Step no A.10.

On completion of this step, we obtain the symbols which are on carriers and which satisfy:

$$\hat{b}_{m,i} = \exp(j\alpha_i)b_{m,i} \text{ with } b_{m,i} = \exp(j2\pi f_i m I_i T_e)a_{m,i} \text{ for } 1 \leq i \leq M \quad (31)$$

Where $f_i$ is the carrier frequency of the $i^{th}$ transmitter.

Estimation of the Carrier Frequencies of Each of the Transmitters.

The objective of this step is to determine the baseband symbol trains $\{a_{m,i}\}$ for $1 \leq i \leq M$ from the symbol trains $\{b_{m,i}\}$.

Accordingly, we estimate the carrier frequency $f_i$ of the transmitter where the complex $z_i = \exp(j2\pi f_i T_e)$ so as thereafter to deduce the symbols $\{a_{m,i}\}$ from the symbols $\{\hat{b}_{m,i}\}$ by performing according to (4):

$$\hat{a}_{m,i} = \hat{b}_{m,i} \exp(-j2\pi f_i m I_i T_e) = b_{m,i} z_i^{-mI_i} \quad (32)$$

According to equations (4) (25) (26) (29), the vector $\hat{h}_{z,i}$ with $\hat{a}_{m,i}$ satisfies:

$$\hat{h}_{z,i} = h_{z,i}(n) = \begin{bmatrix} z_i^{nl_i} h_i(nI_i T_e) \\ z_i^{nl_i+1} h_i(nI_i T_e + T_e) \\ \vdots \\ z_i^{nl_i+(l_i+1)} h_i(nI_i T_e + (l_i-1)T_e) \end{bmatrix} \quad (33)$$

with $$h_i(t) = V_{iq} \begin{bmatrix} h_i(t - \tau_{q,i,1}) \\ \vdots \\ h_i(t - \tau_{q,i,P_{iq}}) \end{bmatrix}.$$

where $h_i(t)$ is the waveform of the $i^{th}$ transmitter.

Searching for $f_i$ consists notably in maximizing the following criterion:

$$\text{Carrier}(f_i) = \left| \hat{h}^H_{z,i} u_i(\exp(-j2\pi f_i T_e)) \right|^2 \quad (34)$$

with $$u_i(z) = c_i(z) \otimes 1(P_{iq})$$

where $$c_i(z) = \begin{bmatrix} 1 \\ z \\ \vdots \\ z^{(l_i-1)} \end{bmatrix} \text{ and } 1(P) = \begin{bmatrix} 1 \\ \vdots \\ 1 \end{bmatrix}.$$

Where 1(P) is a vector of dimension P×1. Once the frequency $f_i$ is determined, the baseband symbol $\hat{a}_{m,i}$ is estimated by applying equation (32). However according to (31), the symbol $\hat{a}_{m,i}$ remains known to within a phase indeterminacy: $\alpha_i$.

Figure 6:
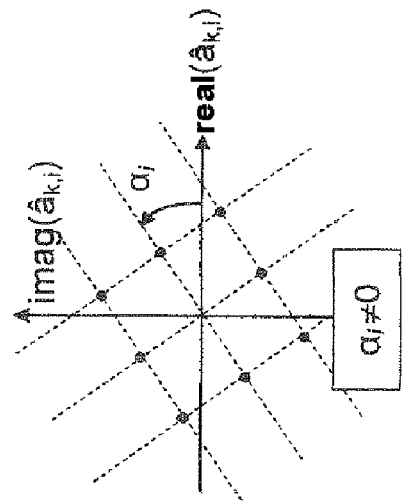
Figure 6:
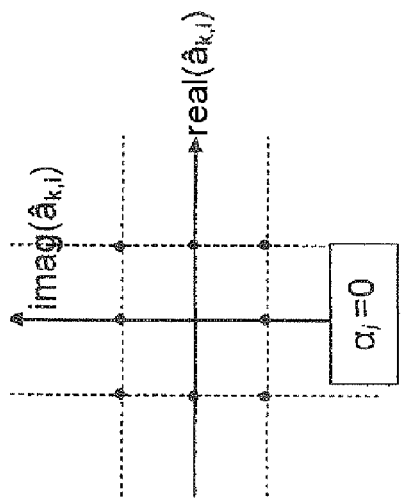

Determination of the Phase Indeterminacy of the Symbols of the $i^{th}$ Transmitter Given that the estimated symbols satisfy according to (31):

$$\hat{a}_{m,i} = \exp(j\alpha_i)a_{m,I} \quad (35)$$

an objective of a step of the method is to estimate this phase $\alpha_i$. The first step will consist in identifying the constellation of the symbols $a_{m,i}$ from among a database composed of the whole set of possible constellations. FIG. 6 shows an example of 8-QAM when $\alpha_i=0$ and $\alpha_i \neq 0$.

To identify the constellation and determine the phase, the method executes for example the following steps:

Step no B.1: Estimation of the positions of the states of the constellation (hatched points in FIG. 6) by searching for the maxima of the 2D histogram of the points $M_k$=(real $(\hat{a}_{k,i})$, imag$(\hat{a}_{k,i})$). For a constellation with M states, we obtain M pairs $(\hat{u}_m, \hat{v}_m)$ for $1 \leq m \leq M$.

Step no B.2: Determination of the type of constellation by comparing the position of the states $(\hat{u}_m, \hat{v}_m)$ of the constellation of the $\{\hat{a}_{k,i}\}$, with a database composed of the whole set of possible constellations. The closest constellation is composed of the states $(u_m, v_m)$ for $1 \leq m \leq M$.

Step no B.3: Determination of the phase $\alpha_i$ by minimizing within the least squares sense the following system of equations:

$$\hat{u}_m = \cos(\alpha_i)u_m - \sin(\alpha_i)v_m \text{ and } \hat{v}_m = \sin(\alpha_i)u_m + \cos(\alpha_i)v_m$$
$$\text{for } 1 \leq m \leq M$$

To summarize; the first variant implementation of the method according to the invention comprises at least the following steps:

Step no I.1: Application of an ICA separation type procedure [3] [4] [8] [10] to the observations x(t) (corresponding to the linear mixture of the multi-paths of each of the M transmitters) of equation (5) to obtain the vector output signal ŝ(t) of all the independent outputs which include the linear combinations of the multi-paths and the matrix Â of equation (21), the matrix being the mixture matrix of the independent outputs, Step no I.2: Extraction of the pair (ŝ(t), Â) from the pairs (Â$_n$, ŝ$_n$(t)) of equation (24) associated with a group of correlated multi-paths of one of the transmitters: Identification of the independent outputs belonging to 2 groups of different multi-paths. Extraction of the groups of multi-paths, Step no I.3 (Option): For each pair (Â$_n$, ŝ$_n$(t)) (group of multi-paths of a transmitter such that $$1 \leq n \leq \sum_{i=1}^{M} Q_i)$$

estimation of the incidences and delays of a group of correlated multi-paths of one of the transmitters, n is the index of a group, Step no I.5: n=1, for each group of multi-paths, Step no I.6: Determination of the symbol time T$_n$ by applying a cyclic detection algorithm as in [2] [7] to ŝ$_n$(t), Step no I.7: Interpolation of the observations ŝ$_n$(t) with I$_n$ samples per symbol such that T$_n$=I$_n$T$_e$, Step no I.8: Demodulation of the symbols $\hat{b}_{m,n}$ of the n$^{th}$ output ŝ$_n$(t) associated with the channel vector $\hat{h}_{z,n}$ of equation (28) (Paragraph 0). n=n+1 and return to step no I.8 if n<K (K: Number of independent outputs of ŝ(t)) we return to step I.5, Step no I.9: Grouping of the symbol trains {$\hat{b}_{m,n}$} associated with the same transmitter. For this purpose steps A.1 up to A.12 described previously are executed. The M pairs {$\hat{b}_{m,i}$, $\hat{h}_{z,i}$} equation (31) for (1≤i≤M) are obtained at output, these pairs are associated with the most powerful output, Step no I.10: Estimation of the carrier frequencies f$_i$ of each transmitter so as to deduce the baseband symbol therefrom in the following manner: $\hat{a}_{m,i}=\hat{b}_{m,i}\exp(-j2\pi f_i mI_iT_e)$, Step no I.11: Determination of the phase rotation α$_i$ of the symbol train {$\hat{a}_{m,i}$} by applying steps B.1 to B.3 set out previously. Correction of the symbols $\hat{a}_{m,i}$ by performing for (1≤i≤M): $a_{m,i}=\exp(-j\alpha_i)\hat{a}_{m,i}$. The symbol trains {$a_{m,i}$} for (1≤i≤M) constitute the outputs of the MIMO demodulator of this sub-method, Second Variant Embodiment of the Method: Direct MIMO Demodulation The second variant embodiment consists in extracting the symbols {$a_{k,i}$} with a single step of ICA source separation by transforming the observation vector x(t).

FIG. 8 shows diagrammatically the steps of the second variant implementation of the method according to the invention. To simplify the notation, in this part the signal X(kT$_e$) is replaced by x(k). In this second variant implementation, the signal model of equation (15) is used. By assuming that there has been a phase of determining the symbol time T$_i$=I$_i$T$_e$ for (1≤i≤M), it is possible to determine the greatest common multiple I of the I$_i$(1≤i≤M). The following spatio-temporal observation is then constructed:

$$z(mI+j) = \begin{bmatrix} x(mI+j) \\ x(mI+1+j) \\ \vdots \\ x(mI+(I-1)+j) \end{bmatrix} \quad (36)$$

$$= \sum_{i=1}^{M} \sum_{l=1}^{L_{c,i}} h_z^i(n(l), \Delta j_i) b_{mJ_i+\Delta m_i-n(l),i} + b_z(t)$$

where $$h_z^i(n, \Delta) = \begin{bmatrix} h_{n,\Delta}^i \\ h_{n,\Delta+1}^i \\ \vdots \\ h_{n,\Delta+I-1}^i \end{bmatrix}.$$

with $h_{n,j}^i=h^i(nI_iT_e+jT_e+t_i)$, $j=\Delta m_iI_i+\Delta j_i I_i J_i=I$ and $b_z(mI)=[b(mI)^T \ldots b(mI+(I-1))^T]^T$. Given that x(t) is of dimension N×1, the vector z(t) is then of dimension NI×1. Each transmitter is associated with $L_{c,i}$×J$_i$ symbol trains {$b_{mJ_i+\Delta m_i-n(l),i}$} for 0≤Δm$_i$<J$_i$ and 1≤l≤L$_{c,i}$. MIMO demodulation will therefore be possible when:

$$\sum_{i=1}^{M} L_{c,i} \times J_i \leq NI. \quad (37)$$

If we are concerned solely with the M$_k$ transmitters of symbol time I$_k$, the model of equation (36) can be written at j=ΔI$_k$ where 0≤Δ<J$_k$:

$$z(mI+\Delta I_k) = \sum_{i \in \Phi_k} H_z^i(0) b_{mJ_k+\Delta,i} + \sum_{l \in \Phi_k^\perp} H_z^l(\Delta j_l) b_{mJ_l+\Delta m_l,l} + b_z(t) \quad (38)$$

where $$H_z^i(\Delta) = [h_z^i(n(1), \Delta) \ldots h_z^i(n(L_{c,i}), \Delta)]$$

and $$b_{mJ_i+\Delta m_i,i} = \begin{bmatrix} b_{mJ_i+\Delta m_i-n(1),i} \\ \vdots \\ b_{mJ_i+\Delta m_i-n(L_{c,i}),i} \end{bmatrix}.$$

Where $\Delta m_i I_i + \Delta j_i = \Delta I_k$, $\Phi_k$ is the set of the indices of the transmitters of symbol time I$_k$ and $\Phi_k^\perp$ the set of the others. More simply still, it is possible to write:

$$z(mI+\Delta I_k) = H^k b_{mJ_k+\Delta} + H^{k\perp}(\Delta) b_{mJ_k+\Delta}^\perp + b_z(t) \quad (39)$$

where $$H^k = [\ldots H_z^i(0) \ldots] \text{ and } b_{mJ_k+\Delta} = \begin{bmatrix} \vdots \\ b_{mJ_k+\Delta,i} \\ \vdots \end{bmatrix} \text{ for } i \in \Phi_k$$

where $$H^{k\perp}(\Delta) = [\ldots H_z^l(\Delta j_l) \ldots]$$

and

-continued $$b^\perp_{mJ_k+\Delta} = \begin{bmatrix} \vdots \\ b_{mJ_l+\Delta m_l,l} \\ \vdots \end{bmatrix} \text{ for } l \in \Phi_k^\perp.$$

Written globally we then have:

$$z(ml + \Delta I_k) = H(k,\Delta)b_{m,\Delta,k} + b_z(t) \quad (40)$$

where $$H(k,\Delta) = [H^k \; H^{k\perp}(\Delta)] \text{ and } b_{m,\Delta,k} = \begin{bmatrix} b_{mJ_k+\Delta} \\ b^\perp_{mJ_k+\Delta} \end{bmatrix}.$$

By applying a procedure for separating sources to the string of observations $z(\Delta I_k)$, $z(I+\Delta I_k)$, $z(2I+\Delta I_k)$ ..., we obtain the symbol vectors be $b_{m,\Delta,k}$ and the channel matrix $H(k,\Delta)$ to within a diagonal matrix $\Omega(k,\Delta)$ and a permutation matrix $\Pi(k,\Delta)$, such that:

$$\hat{H}(k,\Delta)=H(k,\Delta)\Omega(k,\Delta)\Pi(k,\Delta) \text{ and } \hat{b}_{m,\Delta,k}=\Pi(k,\Delta)^{-1}\Omega(k,\Delta)^{-1}b_{m,\Delta,k} \quad (41).$$

Given that the power of the symbols $b_{k,i}$ is the same for all the transmitters we deduce that $E[b_{m,\Delta,k}b_{m,\Delta,k}^H]=I$ and that it is possible to put $|\Omega(k,\Delta)|=I$.

Extraction of the Transmitters with $I_k$ Samples Per Symbol

By applying a source separation procedure to all the combs $\Delta$ associated with the observations $z(mI+\Delta I_k)$ for $0 \leq \Delta < J_k$, it is possible to compare the results in $\Delta$ and $\Delta'$ so as to identify the outputs associated with the transmitters with $I_k$ samples per symbol. Under its conditions according to (41):

$$J(\Delta',\Delta)=|\hat{H}(k,\Delta')^\# \hat{H}(k,\Delta)|=\Pi(k,\Delta')^{-1}|H(k,\Delta')^\# H(k,\Delta)|\Pi(k,\Delta) \quad (42)$$

Where $^\#$ designates the pseudo-inverse. Noting according to (40) that the matrices $H(k,\Delta)$ for $0 \leq \Delta < J_k$ are all composed of the channel matrix $H^k$ of the transmitters with $I_k$ samples per symbol, we obtain:

$$J(\Delta',\Delta) = \Pi(k,\Delta')^{-1} \begin{bmatrix} I_{L_k} & U \\ 0 & V \end{bmatrix} \Pi(k,\Delta). \quad (43)$$

where $I_K$ is the identity matrix of dimension K×K $$L_k = \sum_{i \in \Phi_k} L_{c,i}$$

and U and V are matrices dependent on $H^{k\perp}(\Delta)$, $H^{k\perp}(\Delta')$ and $H^k$. Denoting by $J_{ij}(\Delta',\Delta)$ the $ij^{th}$ element of the matrix $J(\Delta',\Delta)$, the associating of the outputs $\hat{H}(k,\Delta)$ and $\hat{H}(k,\Delta')$ will consist in seeking the elements of the matrix $J(\Delta',\Delta)$ close to 1. The steps allowing the extraction of the symbol trains $\{b_{mJ_k+\Delta}\}$ and the channel matrix $H^k$ from the symbol trains $\hat{b}_{m,\Delta,k}$ and the channel matrices $\hat{H}(k,\Delta)$ are the following:

Step B-0: $\Delta=0$ and $\Delta'=1$. Initialization of the components of the vectors $\hat{b}_n$ and of the matrix $\hat{H}^k$ to zero, Step B-1: Calculation of the matrix $J(\Delta',\Delta)$ of dimension P×P from $\hat{H}(k,\Delta')$ and $\hat{H}(k,\Delta)$ according to (42), Step B-2: i=1 and j=1, Step B-4: If $|J_{ij}(\Delta',\Delta)-1|>\eta$ (close to 0) then the $i^{th}$ output of $\hat{H}(k,\Delta')$ is associated with the $j^{th}$ output of $\hat{H}(k,\Delta)$. If $|J_{ij}(\Delta',\Delta)-1|\leq\eta$ then jump to step B-8, Step B-5: Determination of the phase difference $\phi$ between pathways "i" and "j" which is the phase of:

$$\exp(j\varphi) = \frac{\hat{h}_i(k,\Delta')^H \hat{h}_j(k,\Delta)}{\sqrt{\left(\hat{h}_i(k,\Delta')^H \hat{h}_i(k,\Delta')\right)\left(\hat{h}_j(k,\Delta)^H \hat{h}_j(k,\Delta)\right)}}$$

where $\hat{h}_i(k,\Delta)$ is the $i^{th}$ column of $\hat{H}(k,\Delta)$

Step B-6: Construction of the symbol vectors $\hat{b}_n$ where the $j^{th}$ components satisfy: $\hat{b}_{mJ_k+\Delta}(j)=\hat{b}_{m,\Delta,k}(j)$ and $\hat{b}_{mJ_k+\Delta}(j)=\exp(j\phi)\hat{b}_{m,\Delta',k}(i)$.

Step B-7: Filling in of the channel matrix $\hat{H}^k$ where $j^{th}$ columns satisfy: $\hat{H}^k(j)=\hat{h}_j(k,\Delta)$ and $\hat{b}_{mJ_k+\Delta'}(j)=\exp(j\phi)\hat{b}_{m,\Delta',k}(i)$, Step B-8: j=j+1 and return to step B-4 if $j \leq P$, Step B-9: i=i+1 and return to step B-4 if $i \leq P$.

Step B-10: Elimination of the zero rows of the symbol trains $\{\hat{b}_n\}$ and of the zero columns of the channel matrix $\hat{H}^k$.

At the end of this association, symbol trains $\{\hat{b}_n\}$ and a channel matrix $\hat{H}^k$ associated with the transmitters with $I_k$ samples per symbol are obtained. However they are still to within a permutation matrix the symbol trains $\{b_{mJ_k+\Delta}\}$ and the channel matrix $H^k$:

$$\hat{H}^k=H^k\Pi(k) \text{ and } \hat{b}_n=\Pi(k)^{-1}b_{mJ_k+\Delta} \quad (44).$$

The objective of the following step is to separate the transmitters with $I_k$ samples per symbol.

Separation of the Transmitters with $I_k$ Samples Per Symbol

In this step, a factor $L_{max}$ of maximum coherence of the symbols is chosen. It is therefore assumed that the temporal spreading of the transmitters does not exceed $L_{max} T_e$. Accordingly by putting $\hat{b}_{m,j}$ the $i^{th}$ component of the vector $\hat{b}_m$ and $\hat{h}_{z,i}$ the $i^{th}$ column of the vector $\hat{H}^k$, it suffices to apply steps A.1 to A.12 set out previously.

On completion of this step the estimated symbols are not in baseband while satisfying according to (4):

$$\hat{b}_{m,i}=\exp(j\alpha_i)b_{m,i} \text{ with } b_{m,i}=\exp(j2\pi f_i mI_k T_e)a_{m,i} \text{ for } i \in \Phi_k \quad (45).$$

Where $f_i$ is the carrier frequency of the $i^{th}$ transmitter.

Estimation of the Carrier Frequencies of Each of the Transmitters.

The objective of this step to determine the baseband symbol trains $\{a_{m,i}\}$ for $i \in \Phi_k$ from the symbol trains $\{b_{m,i}\}$. We denote by $\hat{h}_{z,i}$ a column of $\hat{H}^k$.

For this purpose, the carrier frequency $f_i$ of the transmitter or the complex $z_i=\exp(j2\pi f_i T_e)$ is estimated so as thereafter to deduce the symbols $\{a_{m,i}\}$ from the symbols $\{\hat{b}_{m,i}\}$ by performing according to (4):

$$\hat{a}_{m,i}=\hat{b}_{m,i}\exp(-j2\pi f_i mI_k T_e)=b_m z_i^{-mI_k} \quad (46)$$

According to (4) (14) (15) (36) (45) the vector $\hat{h}_{z,i}$ with $\hat{a}_{m,i}$ satisfies:

$$\hat{h}_{z,i} = h_{zi}(n) = \begin{bmatrix} z_i^{nI_k} h_i(nI_k T_e) \\ z_i^{nI_k+1} h_i(nI_k T_e + T_e) \\ \vdots \\ z_i^{nI_k+(I-1)} h_i(nI_k T_e + (I-1)T_e) \end{bmatrix} \quad (47)$$

with

-continued $$h^i(t) = \sum_{p=1}^{P_i} \rho_{pi} a(\theta_{pi}) h_i(t - \tau_{pi}).$$

where $h_i(t)$ is the waveform of the $i^{th}$ transmitter.

Searching for $f_i$ consists in maximizing the following criterion:

$$\text{Carrier}(f_i) = \left| \hat{h}_{z,i}^H u_i(\exp(-j2\pi f_i T_e)) \right|^2 \qquad (48)$$

with $$u_i(z) = c_i(z) \otimes 1(P_{iq})$$

where $$c_i(z) = \begin{bmatrix} 1 \\ z \\ \vdots \\ z^{(l-1)} \end{bmatrix} \text{ and } 1(P) = \begin{bmatrix} 1 \\ \vdots \\ 1 \end{bmatrix}.$$

Where 1(P) is a vector of dimension P×1. Once the frequency $f_i$ is determined the baseband symbol $\hat{a}_{m,i}$ is estimated by applying equation (32). However according to (31), the symbol $\hat{a}_{m,i}$ remains known to within a phase indeterminacy: $\alpha_i$.

Determination of the Phase Indeterminacy of the Symbols of the $i^{th}$ Transmitter The phase $\alpha_i$ is determined by using for example equation (35) given previously.

To summarize; the second variant embodiment of the method according to the invention comprises for example the following steps:

Step no J.1: Determination of the symbol times $T_i$ ($1 \leq i \leq K$) by applying a cyclic detection algorithm as in [2] [7] to x(t), Step no J.2: Search for the greatest common multiple T of the $T_k$ ($1 \leq k \leq K$) and sampling at $T_e$ of the observations x(t) such that $T=IT_e$ and $T_k=I_k T_e$ ($1 \leq k \leq K$). Deduction of the indices $T_k=I_k T_e$ ($1 \leq k \leq K$), Step no J.3: Initialization k=1, Step no J.4: Initialization to Δ=0, Step no J.5: Application of an ICA procedure [3] [4] [8] [10] to the string of observations $z(mI+\Delta I_k)$ indexed by "m" of equation (38) to obtain the symbol trains $\{\hat{b}_{m,\Delta,k}\}$ and the channel matrix $\hat{H}(k,\Delta)$, Step no J.6: Δ=Δ+1 and if Δ≤$J_k$ return to step no J.5, Step no J.7: Extraction of the transmitters with $I_k$ samples per symbol by applying steps B.0 to B.10 of paragraph 0: Obtaining of an estimate $\{\hat{b}_n\}$ of the symbol trains $\{b_{mJ_k+\Delta}\}$ as well as an estimate $\hat{H}^k$ of the channel matrix $H^k$ of equation (40), Step no J.8 Extraction of $\{\hat{b}_n\}$ from the trains of the symbols $\{\hat{b}_{n,i}\}$ associated with the $i^{th}$ transmitter such that i∈$\Phi_k$. For this purpose it is necessary to apply steps A.1 up to A.12 of the paragraph association of the symbol trains dependent on the same transmitter. The $M_k$ pairs $\{\hat{b}_{m,i}, \hat{h}_{z,i}\}$ of equation (36) for i∈$\Phi_k$ are obtained as output, where $\hat{h}_{z,i}$ is a column of the matrix $\hat{H}^k$ associated with the $i^{th}$ transmitter, Step no J.9: Estimation of the carrier frequencies $f_i$ of each transmitter so as to deduce therefrom the baseband symbol in the following manner: $\hat{a}_{m,i} = \hat{b}_{m,i} \exp(-j2\pi f_i m I_k T_e)$ (Paragraph (5)), Step no J.10: Determination of the phase rotation $\alpha_i$ of the symbol train $\{\hat{a}_{m,i}\}$ by applying steps B.1 to B.3 of paragraph (6). Correction of the symbols $\hat{a}_{m,i}$ by performing for ($1 \leq i \leq M$): $a_{m,i} = \exp(-j\alpha_i) \hat{a}_{m,i}$. The symbol trains $\{a_{m,i}\}$ for i∈$\Phi_k$ constitute the outputs of the MIMO demodulator of this sub-method, Step no J.11: k=k+1 and if k≤K return to step no J.4.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

References

[1] R O. Schmidt. *A signal subspace approach to multiple emitter location and spectral estimation*, November 1981

[2] S V. SCHELL and W. GARDNER, Detection of the number of cyclostationary signals in unknown interference and noise, Proc Asilonan conf on signals, systems and computers, Nov. 5-9, 1990.

[3] J. F. CARDOSO, A. SOULOUMIAC, Blind beamforming for non-Gaussian signals, IEEE Proceedings-F, Vol. 140, No 6, pp. 362-370, December 1993.

[4] P. COMON, Independent Component Analysis, a new concept~?",Signal Processing, Elsevier", April 1994, vol 36", no 3, pp 287-314.

[5] E. MOULINES, P. DUHAMEL, J. F. CARDOSO and S. MAYRARGUE. *Subspace methods for the blind identification of multichannel FIR filters*. IEEE transaction On signal Processing. Vol 43, no 2, pp 516-525, February 1995.

[6] P. CHEVALIER, V. CAPDEVIELLE, P. COMON, *Behavior of HO blind source separation methods in the presence of cyclostationary correlated multi-paths*, IEEE SP Workshop on HOS, Alberta (Canada), July 1997.

[7] A. FERREOL. Patent no fr9800731. *Procédé détection cyclique en diversité de polarisation*. [Method of cyclic detection under polarization diversity] Jan. 23, 1998.

[8] P. COMON, *From source separation to blind equalization, contrast-based approaches*, ICISP 01, Int. Conf. on Image and Signal Processing, May 3-5, 2001, Agadir, Morocco, pp 20-32.

[9] L. PERROS-MEILHAC, E. MOULINES, K. ABED-MERAIM, P. CHEVALIER and P. DUHAMEL, *Blind identification of multi-path channels: A parametric subspace approach*. IEEE transaction On signal Processing. Vol 49, no 7, pp 1468-1480, July 2001.

[10] L. ALBERA, A. FERREOL, P. CHEVALIER and P. COMON, ICAR, un algorithme d' ICA à convergence rapide, robuste au bruit, [a fast-convergence, noise-robust ICA algorithm] GRETSI, Paris, 2003.

[11] A. Touzni, I. Fijalkow, M. Larimore & J. R. Treichler, *A globally convergent approach for blind MIMO adaptive deconvolution*, ICASSP 98, pp 2385-2388

[12] A. Gorokhov, P H. Loubaton & E. Moulines, *Second order blind equalization in multiple input multiple output FIR systems: A weighted least squares approach*, ICASSP 96, pp 2417-2420

[13] J. K. Tugnait, "*Blind spatio-temporal equalization and impulse response estimation for MIMO channels using a Godard cost function,*" IEEE Trans. Signal Processing, vol. 45, pp. 268-271, January 1997.

[14] Y. Inouye, G. B. Giannakis, and J. M. Mendel, "*Cumulant based parameter estimation of multichannel moving-average processes,*" Proc. ICASSP '88, pp. 1252-1255, April 1988.

The invention claimed is:

1. A method of demodulation of signals arising from one or more transmitters, the signals including a mixture of symbols comprising the steps of:
   receiving the signals on a system comprising a plurality of receivers; and
   blind demodulation of the signals, based on outputs of the plurality of receivers, comprising separating the signals transmitted from at least one of the transmitters by using temporal spreading of indexed symbol trains $\{a_{k-p,\,i}\}$, where k is a temporal index of the symbol train, where p is an index of a propagation channel between the one of the transmitters and the plurality of receivers, and where i is an index the one of the transmitters.

2. The method as claimed in claim 1, comprising a first step of separating the signals from the various transmitters after having passed through the propagation channels based on the outputs of the plurality of receivers and a second step comprising extracting the best baseband symbol train $\{a_{k-p,\,i}\}$ of each transmitter on the basis of the separated signals of the first step.

3. The method as claimed in claim 1, comprising a step where an observation vector composed of the signals received after having passed through the propagation channels is transformed into a spatio-temporal vector and a step of separating the transmitters, executed on the spatio-temporal vector so as to jointly extract the baseband symbol trains $\{a_{k-p,\,i}\}$ for each transmitter.

4. The method as claimed in claim 3, comprising a step of determining a phase rotation of the symbol train.

* * * * *